May 16, 1961 H. J. WELCH 2,984,507
BAFFLE TO PROTECT AXIAL CONTACT SEAL
Filed Aug. 22, 1957 2 Sheets-Sheet 1

Inventor
Harry J. Welch
By Arthur M. Streich
Attorney

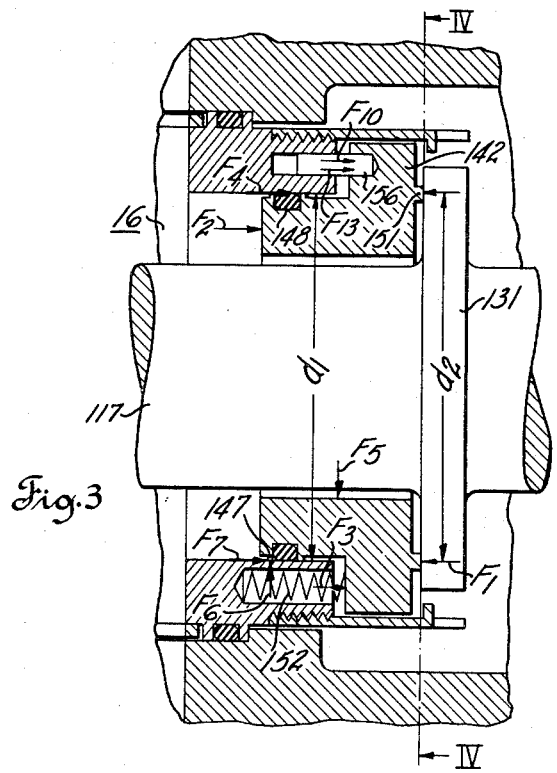

United States Patent Office 2,984,507
Patented May 16, 1961

2,984,507
BAFFLE TO PROTECT AXIAL CONTACT SEAL

Harry J. Welch, Milwaukee, Wis., assignor to Allis-Chalmers Manufacturing Company, Milwaukee, Wis.

Filed Aug. 22, 1957, Ser. No. 679,558

2 Claims. (Cl. 286—11.14)

This invention relates to seals or to improvements in seals for rotary shafts against fluid leakage at their points of extension through closure casings. For illustrative purposes, it is disclosed herein as adapted for the prevention of the escape of the fluid within a fluid filled chamber of compressors, pumps and the like.

A seal of this character comprises a sealing member in the form of a collar that rotates with the shaft and cooperates with a matching nonrotating seal ring member having freedom of axial movement, and in axial sealing contact with the rotating collar to form an intervening seal gap of sufficiently small dimension to hold fluid leakage between the sealing surfaces of the two members, to an acceptable minimum rate. The nonrotating sealing member is floatingly mounted to be urged axially toward the rotating member, by spring pressure.

Oil, or any other suitable sealing fluid, at a pressure slightly above or below that of the inlet of the machine, dependent upon the application, is introduced into the chamber of the seal housing. The seal may be designed to allow for the flow of the fluid within the machine casing past the sealing members and into the seal housing; or for the flow of the sealing oil in the housing past the sealing members to the fluid chamber of the machine casing, depending upon the pressures involved and the specific application desired, to effect the desired results.

The sealing surface on a seal ring floats axially relative to the shaft in order to maintain contact with the rotating collar, and in moving axially the seal ring has to overcome forces due to friction. Because of the close clearances involved between the seal ring and the rotating shaft, the oil occupying the space between the seal ring and rotating shaft will create hydrodynamic forces of extreme magnitude that will affect the ability of the seal ring to move axially relative to its supporting structure without objectional resistance which would interfere with the proper functioning of the seal ring against the rotating collar.

The objectionable resistant forces here involved are a summation of forces created between the supporting structure of the seal ring and the structure of the seal ring proper, created from the hydrodynamic forces previously mentioned. These objectionable resistant forces will be defined and discussed, further on, in detail.

The spring force employed to urge the seal ring into contact with its rotating sealing member is a function of all of the resistant forces, for when the rotating collar on a shaft is moving away from the seal ring assembly the spring has to be strong enough to move the seal ring and maintain sealing contact with the rotating collar. The problem these resistant forces create, is that all of the forces add up to a value which is so great that the sealing surface of the seal ring where it is in contact with the rotating collar, is too heavily loaded resulting in wear and gall of the sealing surfaces. If the spring force is maintained as low as possible to lessen the load, conditions are reached where the sealing surface of the seal ring will not follow the rotating collar as it moves axially, resulting in a gap between the sealing surfaces, and therefore, excessive seal leakage. By providing a baffle ring between the seal ring and the shaft, the seal ring is protected from the forces imposed on the seal ring by the shaft.

The primary object of the invention is to provide an improved seal or sealing device wherein the sealing element is protected from the frictional forces due to hydrodynamic forces, developed with the movement of the sealing element within its housing, so as to prevent the sealing element from being worn and galled with the resultant destruction of the seal.

Another object is to provide an improved seal that affords simplicity in construction, and is of greater durability and that can be installed and serviced with the minimum of time, skill and effort.

The foregoing and other objects and advantages will be apparent from the description herein explained in conjunction with the accompanying drawings:

Fig. 3 is a free body diagram of a seal ring, showing all of the forces imposed upon it; and Fig. 4 is an end view taken along line IV—IV of Fig. 3.

Figure 1:
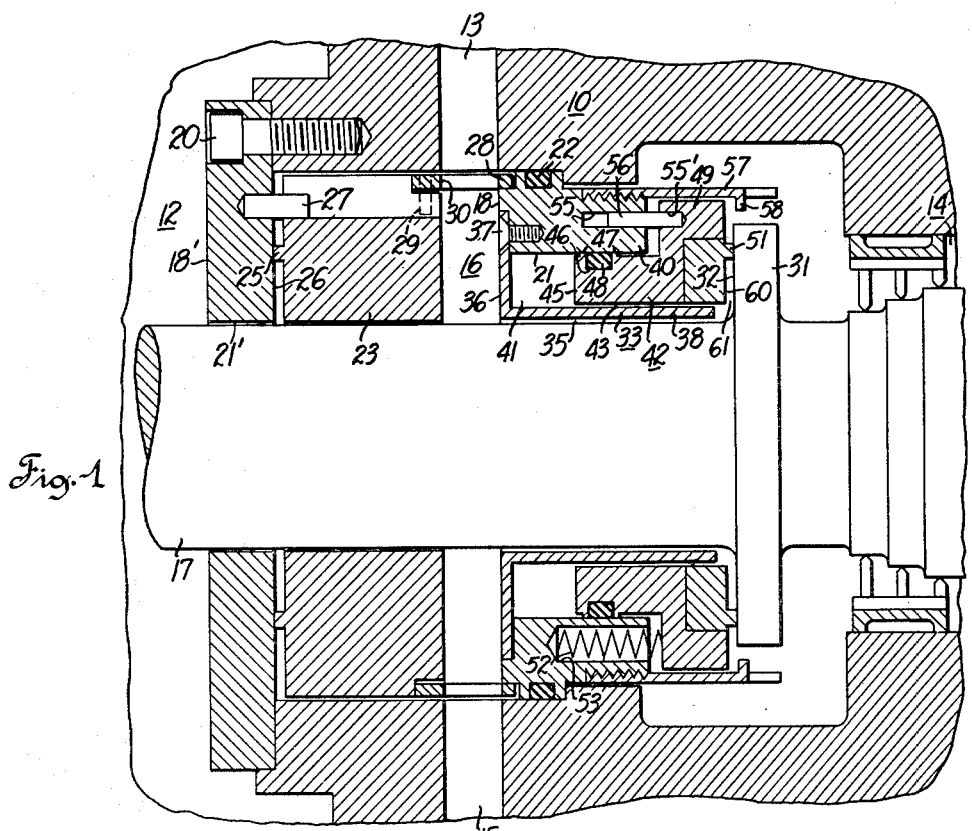
Fig. 1 is a detail showing of the pressure seal in section.

In the illustrated embodiment, a seal housing 10 separates the fluid filled first chamber 14 under pressure, from the exterior of the machine at 12, which is subjected to air at atmospheric pressure.

The seal housing has an oil inlet passage 13 and an oil outlet passage 15. Separating the oil passages is an annular shaped second chamber 16 formed by the seal housing 10 and the shaft 17, and enclosed by inwardly extending members comprising a first annular wall 18 and a second annular wall 18'. The second annular wall 18' is detachably connected, by suitable means such as bolt 20, to the housing of the seal. The annular walls each have a circular opening 21 and 21' through which the shaft 17 passes. First annular wall 18 has suitable sealing means, such as O-ring 22, to prevent the sealing fluid within the second chamber 16 from passing between the housing of the seal and the first annular wall 18.

In this embodiment, there is disposed within the second chamber 16 of the housing, a close clearance ring or bushing 23. The bushing has a continuous ground and lapped land projection 25 on its outerface which endeavors to maintain a fluid tight contact with an inner ground and lapped surface 26 provided on the second annular wall 18'. Any leakage past this contact point is not objectionable, since a considerable amount of recirculated oil to atmosphere is necessary to remove heat generated by the seal assembly. The oil is returned to the suction of a booster pump, not shown, and is refed through the inlet oil passage 13 to the second chamber 16.

A nonrotation pin 27 is placed between the bushing 23 and the second annular wall 18' of the housing 10, to prevent the rotation of the bushing. A spacer ring 28 is interposed within the second chamber 16 of the seal housing between the bushing 23 and the first annular wall 18 of the seal housing, retaining the first annular wall 18 in position. Holes 30 are provided in the spacer ring and are aligned with the inlet and outlet oil passages 13 and 15, to permit the flow of the sealing oil into the second chamber 16 of the seal housing. A pin 29 is placed between the spacer ring 28 and the bushing 23 to prevent rotation of the spacer ring.

A rotating collar 31 extends in an outwardly radial manner from the shaft 17, providing a radial sealing surface abutment 32 or shoulder intermediate the opening of the fluid filled first chamber 14 and the first annular wall 18. The rotating collar 31 may be integral with the shaft 17 or may be affixed in any suitable manner thereto. A baffle ring 33 with a predetermined clearance 35 is fitted over the shaft 17. The baffle ring, as shown in Fig. 1, is provided with an outwardly extending radial flange 36 that is a detachable extension of the first annular wall 18. Suitable attaching means are provided for the baffle ring, such as countersunk screw 37 herein shown. The baffle ring 33 has an axially extending projection 38 from the radial flange 36, that extends along the shaft 17 in the direction of but spaced from the rotating collar 31.

Figure 2:
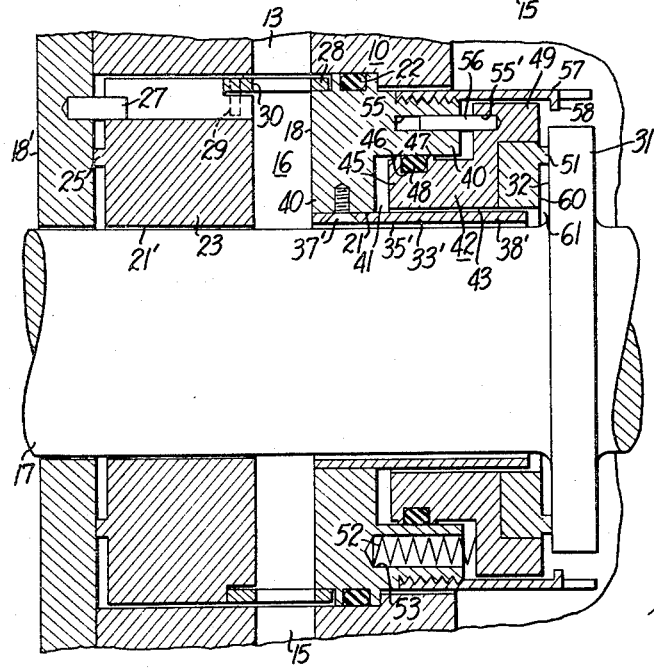
Fig. 2 is a modified detail showing of the pressure seal in section.

A baffle ring may also be employed with the construction shown in Fig. 2, of a modified seal, wherein the baffle ring 33' consists of an annular projection 38' having a predetermined clearance 35' and extending axially along the shaft 17 in the direction of but spaced from the rotating collar 31. The ring may be detachably connected to the bottom of the first annular wall 18 by countersunk screw 37'. The first annular wall 18 provides an axially extending projection 40 that is parallel to and spaced from the axial extension 38 of the baffle ring 33, therewith forming a recess 41. Though not shown, the first annular wall 18 may be machined to form a unit in which the baffle ring 33' is integral with the first annular wall 18.

A seal ring 42, with sufficient clearance 43 to float axially is inserted over the baffle ring 33, and has a cylindrical portion 45 at least partially within the recess 41. A groove 46 is provided in the outer circumferential surface of the cylindrical portion 45 of the seal ring 42 that is partially within the recess 41. On each side of the groove 46, a radial annular projection from the outer circumferential surface of cylindrical portion 45, having an outer diameter less than the inner diameter of the axial extending projection 40 of the first annular wall 18, is provided. These projections, or centering guides 47, are provided to assist in confining a ring 48, of resilient deformable material which is partially disposed within the groove 46. The resilient ring 48 has a substantially circular cross section, such as an O-ring of a rubberlike material, and is in fluid tight sealing contact with the inner surface of axially extending projection 40 of the first annular wall 18. The resilient ring prevents any fluid flow of the sealing oil from second chamber 16 or of the pressurized fluid within the first chamber 14 from passing the prior mentioned point of sealing contact. The O-ring 48, before placement in the groove 46, has a static inner diameter less than the diameter of the groove 46, and therefore must be stretched for placement within the groove. The static outer diameter of the O-ring 48 is greater than the diameter of the inner surface of the axially extending first annular wall projection 40, resulting in the compression of the O-ring within the groove 46 against the projection 40, forming thereby a fluid tight seal.

The seal ring 42 has a portion 49 outside of the recess 41, which extends radially, and in parallel relationship to the first annular wall 18. The outer face of the seal ring 42 is provided with an annular projection forming a nosepiece 51 having a ground and lapped surface. The nosepiece 51 of the seal ring is in axial contact with the radial sealing surface 32 of the rotating collar 31. Spring means 52 are provided between the first annular wall 18 and the seal ring 42 to urge the nosepiece 51 of the seal ring into sealing engagement with the radial sealing surface 32 of the rotating collar. Suitable retaining means are provided for housing the spring 52, such as the axial bore 53 in the first annular wall 18. An axial bore 55 is also provided in the first annular wall 18 for housing a pin 56 that is placed between the first annular wall 18 and a corresponding axial bore 55' in the seal ring 42, to prevent rotation of the seal ring.

An assembly lock 57 is threadingly engaged with the outer circumferential surface of the axial extending projection 40 of the first annular wall 18. The assembly lock extends axially and parallel to the baffle ring's axial extension 38 and is provided with an inwardly radial extending lip 58. The assembly lock 57 permits the removal of the entire seal assembly, including the first annular wall 18 with the baffle ring 33, and the seal ring 42, as a unit, in the event repairs or changes are required, providing thereby compactness and ease in handling.

Fig. 3 is a free body diagram of a seal ring 142 showing all of the forces imposed upon it. Baffle ring 33 is not shown.

$P_{16}$ = pressure in second chamber 16.
$P_{14}$ = pressure inside the first chamber 14.
$d_1$ = diameter where O-ring 148 seals between $P_{16}$ and $P_{14}$.
$d_2$ = diameter where nosepiece 151 seals between $P_{16}$ and $P_{14}$.
$F_1$ = axial contact force between seal ring 142 and rotating collar 131.
$F_2$ = axial force on seal ring 142 due to unbalance of hydrostatic forces $P_{16}$ and $P_{14}$.

$$F_2 = P_{16}\frac{\pi}{4}(d_1^2 - d_2^2) - P_{14}\frac{\pi}{4}(d_1^2 - d_2^2)$$

$$F_2 = (P_{16} - P_{14})\frac{\pi}{4}(d_1^2 - d_2^2)$$

$F_2$ by design can be made negligible or can be given a definite positive or negative value.

$F_3$ = axial force of springs 152.
$F_4$ = axial friction force resisting axial movement of the O-ring 148. $F_4$ is a function of the amount of deformation of the O-ring and the pressure sealed ($P_{16} - P_{14}$). The direction of $F_4$ will always be such as to oppose axial movement of the seal ring.
$F_5$ = radial hydrodynamic force tending to displace the seal ring 142 radially to center it hydraulically with respect to the shaft.
$F_6$ = radial force on centering guide 147 resisting $F_5$.
$F_7$ = axial friction component of $F_6$. The direction of $F_7$ will always be such as to oppose axial movement of seal ring 142.
$F_8$ = tangential fluid friction due to rotation of the shaft 117 inside the seal ring 142, as shown in Fig. 4.
$F_9$ = tangential force of antirotation pin 156 resisting efforts of $F_8$, as shown in Fig. 4.
$F_{10}$ = axial friction component of $F_9$. The direction of $F_{10}$ will always be such as to oppose axial movement of seal ring 142.
$F_{11}$ = tangential friction component of $F_1$ due to rotation of shaft collar 131 relative to nosepiece 51, as shown in Fig. 4.
$F_{12}$ = tangential force of antirotation pin 156 resisting efforts of $F_{11}$, as shown in Fig. 4.
$F_{13}$ = axial friction component of $F_{12}$. The direction of $F_{13}$ will always be such as to oppose axial movement of seal ring 142.

Let us now assume that because of a change in operating temperature or other effect, that rotating collar 131 is moving away from the seal ring 142. During such a condition $F_3$ must be large enough to prevent $F_1$ from reaching a value of zero.

$$F_1 \text{ min.} = F_2 + F_3 - F_4 - F_7 - F_{10} - F_{13} = 0$$

$F_{13}$ is a function of $F_1$ or
$F_{13} = K_{13}F_1$ where $K_{13}$ is a constant, or
$$F_{13} = F_4 + F_7 + F_{10} - F_2. \qquad \text{(Eq. I)}$$

This is the minimum force which the springs 152 must be designed to exert.

Now assume that the movement of the rotating collar 131 is toward the seal ring 142.

$$F_1 \text{ max.} = F_2 + F_3 + F_4 + F_7 + F_{10} + F_{13}$$

$F_{13}$ is a function of $F_1$ or
$F_{13} = K_{13} F_1$ where $K_{13}$ is a constant.

$$F_1 \text{ max.} = \frac{F_2 + F_3 + F_4 + F_7 + F_{10}}{1 - K_{13}}$$

$$F_1 \text{ max.} = \left(\frac{2}{1 - K_{13}}\right) F_4 + F_7 + F_{10} \quad \text{(Eq. II)}$$

$F_1$ max. is the maximum contact pressure between the rotating collar and the nosepiece 151. This value must be kept low enough to prevent galling or excess wear on the contact sealing surfaces.

Assume now that $F_5$ and $F_8$ are eliminated completely by use of described baffle ring 33. Then we eliminate $F_7$ and $F_{10}$.
Then:

$$F_1' \text{ min.} = F_2 + F_3' - F_4 - F_{13} = 0$$
$$F_3' = F_4 - F_2 \quad \text{(Eq. III)}$$

Compare Eq. III to Eq. I, and we learn that the spring 152 can be designed for a force less by the amount of $F_7 + F_{10}$.
Also:

$$F_1' \text{ max.} = F_2 + F_3' + F_4 + F_7 + F_{10} + F_{13}$$

$$F_1' \text{ max.} = \frac{F_2 + F_3' + F_4}{1 - K_{13}}$$

$$F_1' \text{ max.} = \left(\frac{2}{1 - K_{13}}\right) F_4 \quad \text{(Eq. IV)}$$

Compare Eq. IV to Eq. II and we learn that the maximum contact pressure between the rotating collar and the nosepiece has been reduced by $$\frac{2}{1 - K_{13}} (F_7 + F_{10})$$

In general, on high speed equipment, the values of $F_7$ and $F_{10}$ will be large compared to the other forces herein involved which points out the great value of baffle ring 33.

In the operation of the seal, oil under pressure passes through the inlet oil passage 13 of the seal housing 10 into the chamber 16. The pressure of the oil in the seal housing, in this illustrated embodiment, is sufficiently greater than the pressure of the fluid in the first chamber 14; to assure thereby proper sealing of the fluid in the first chamber 14, and to provide the means for causing the oil to pass through the gap between the sealing surfaces of the seal ring 42 and rotating collar 31 toward the fluid filled first chamber 14. The oil will also pass through the clearance 43 formed between the seal ring 42 and the outer diameter of the axial extending projection 38 of the baffle ring 33 to the inner face of the seal ring portion within the recess 41. Further passage of the oil from the recess is prevented by the resilient O-ring 48 in groove 46 of the seal ring. The spring 52, with the assistance of the oil pressure within the recess 41 in this illustrated embodiment, urges the seal ring 42 in an axial direction into sealing engagement with the radial sealing surface 32 of the rotating collar 31.

Before the use of the baffle ring 33, as previously stated, the clearance between the seal ring assembly and the rotating shaft was extremely close, so that the hydrodynamic forces built up were of a very high order of magnitude. If there is any failure in the assembling of the seal to be perfectly concentric with the shaft, the hydrodynamic forces would tend to cause the seal ring to be centered. This centering force was resisted first of all by the centering guides 47 upon any axial movement of the shaft; when the seal ring 42 had to move in a corresponding axial relationship to the rotating collar 31 it was moving under very high forces, and consequently very high friction forces. Because of the rotation of the shaft 17 there is a hydrodynamic force urging the seal ring 42 to rotate with the shaft. This force is resisted by the antirotation pin 56, providing high tangential forces that would also resist the axial movement of the seal ring.

In essence, by inserting the baffle ring 33 between the seal ring 42 and the shaft 17 the forces on the centering guides 47 and the antirotation pin 56 were reduced permitting the seal ring to move axially under desired conditions resulting in no appreciable wear or gall of the sealing surfaces 32 and 51. There will still be some rotational force on the seal ring, because the outer face 60 of the seal ring 42 is facing the rotating collar 31. By keeping the clearance 61 between the seal ring and the rotating collar 31 of sufficient magnitude, the rotational force will be lessened from that previously experienced by the seal ring.

While the form of embodiment of the invention as herein disclosed constitutes a preferred form, it is to be understood that other forms might be adopted, all coming within the scope of the claims which follow.

What is claimed is:

1. In a machine having an enclosed fluid filled first chamber and a shaft passing through an opening in said first chamber, a pressure seal for sealing said opening, said pressure seal comprising: a radially extending collar on said shaft having a radial sealing surface; a housing having a first annular wall axially spaced from the outboard side of said collar and a second annular wall axially spaced from the outboard side of said first annular wall, said first and second annular walls defining a second chamber within said housing; an annular baffle extending from said first wall and being fitted over said shaft with a predetermined clearance to provide a fluid passageway between said baffle and said shaft, said baffle extending axially along said shaft in the direction of but spaced from said collar; an axially extending annular projection of said first wall being concentric with and radially spaced outward from said baffle and thereby defining a recess on the inboard side of said first wall between said baffle and said annular projection; a non-rotatable seal ring arranged with respect to said recess to have at least a portion thereof within said recess, said nonrotatable seal ring being free to move axially with respect to said shaft, said portion of said nonrotatable seal ring within said recess having a predetermined clearance with respect to said baffle to provide a fluid passageway therebetween; sealing means between said nonrotatable seal ring and said annular projection of said housing; a nosepiece, provided with a sealing surface, on said seal ring in axial contact with said radial sealing surface on said radially, extending collar; biasing means continuously biasing said sealing surface of said nosepiece toward axial sealing engagement with said radial sealing surface of said collar; and fluid passage means in said seal housing admitting sealing fluid under predetermined pressure to said second chamber, said sealing fluid flowing from said second chamber through said predetermined clearance between said shaft and said baffle and through said space between said axial extension of said baffle and said radially extending collar to said nosepiece, said sealing fluid flowing through said predetermined clearance between said nonrotatable sealing ring and said baffle to said recess.

2. The combination set forth in claim 1 wherein said sealing fluid at said predetermined pressure within said recess acting upon said sealing ring cooperates with said biasing means to urge said sealing surface of said nosepiece into sealing engagement with said radial sealing surface of said radially extending collar.

References Cited in the file of this patent

UNITED STATES PATENTS

| | | |
|---|---|---|
| 1,315,822 | Doran | Sept. 9, 1919 |
| 1,927,543 | Doyle | Sept. 19, 1933 |
| 2,370,964 | Janette | Mar. 6, 1945 |
| 2,592,728 | Payne | Apr. 15, 1952 |
| 2,653,837 | Voytech | Sept. 29, 1953 |
| 2,672,357 | Voytech | Mar. 16, 1954 |

FOREIGN PATENTS

| | | |
|---|---|---|
| 1,147,047 | France | June 3, 1957 |